US010553051B2

(12) United States Patent
Conlin

(10) Patent No.: US 10,553,051 B2
(45) **Date of Patent: *Feb. 4, 2020**

(54) ACCESS CREDENTIAL READER CONNECTOR

(71) Applicant: Schlage Lock Company LLC, Carmel, IN (US)

(72) Inventor: Michael T. Conlin, Superior, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,537

(22) Filed: Jan. 8, 2019

(65) Prior Publication Data

US 2019/0347880 A1 Nov. 14, 2019

Related U.S. Application Data

(63) Continuation of application No. 15/659,006, filed on Jul. 25, 2017, now Pat. No. 10,176,653, which is a (Continued)

(51) Int. Cl.
*G06F 13/42* (2006.01)
*G07C 9/00* (2006.01)

(52) U.S. Cl.
CPC ...... *G07C 9/00111* (2013.01); *G07C 9/00039* (2013.01); *G07C 9/00142* (2013.01); *Y10T 29/49174* (2015.01)

(58) Field of Classification Search
CPC .............. G07C 9/00182; G07C 9/0069; G07C 9/00944; G07C 9/00111; G07C 9/00309;
(Continued)

(56) References Cited

U.S. PATENT DOCUMENTS 4,788,420 A 11/1988 Chang et al.
6,158,655 A 12/2000 DeVries, Jr. et al.
(Continued)

FOREIGN PATENT DOCUMENTS

CA 2867400 A1 4/2015
WO 2007/092111 A2 8/2007

OTHER PUBLICATIONS

International Search Report for PCT/US13/47679 dated Nov. 22, 2013; 2 pages.

(Continued)

*Primary Examiner* — Joseph H Feild
*Assistant Examiner* — Sharmin Akhter
(74) *Attorney, Agent, or Firm* — Taft Stettinius & Hollister LLP

(57) ABSTRACT

An apparatus including a central access control system and an access reader. The access reader is structured to receive an access credential from the central access control system, and includes a first connector connected with a second connector with the second connector connected to a cable, and with the cable in electronic communication with the central access control system. Connection of the first connector and the second connector places the access reader in electronic communication with the central access control system.

19 Claims, 4 Drawing Sheets

Related U.S. Application Data continuation of application No. 13/926,776, filed on Jun. 25, 2013, now Pat. No. 9,715,776.

(60) Provisional application No. 61/664,147, filed on Jun. 25, 2012.

(58) Field of Classification Search

CPC ...... G07C 2009/00634; G07C 9/00571; G07C 9/00896; G08B 13/08; G08B 21/22; G08B 21/24; E05B 47/0012; E05B 2047/0024; E05B 2047/0026; E05B 2047/0094; E05B 47/0661

USPC ... 70/204, 223, 264, 280, 278.1, 278.7, 422, 70/472, 149, 189, 218, 277; 248/49–74.5

See application file for complete search history.

(56) References Cited

U.S. PATENT DOCUMENTS

| | | | |
|---|---|---|---|
| 7,583,495 | B2 | 9/2009 | Carnevali |
| 7,900,253 | B2 | 3/2011 | Wendling et al. |
| 8,158,883 | B2 | 4/2012 | Soffer |
| 8,379,654 | B2 | 2/2013 | Stone et al. |
| 8,570,156 | B2 | 10/2013 | Barvick et al. |
| 8,858,263 | B2 | 10/2014 | Afra |
| 9,209,569 | B2 | 12/2015 | Schumacher |
| 9,473,361 | B2 | 10/2016 | Coffey |
| 2002/0052138 | A1 | 5/2002 | Janik |
| 2003/0028814 | A1 | 2/2003 | Carta et al. |
| 2007/0040674 | A1 | 2/2007 | Hsu |
| 2009/0174569 | A1 | 7/2009 | Smith et al. |
| 2009/0231091 | A1 | 9/2009 | Burwell et al. |
| 2010/0031713 | A1* | 2/2010 | Brown .................... E05B 47/00 70/91 |
| 2011/0115603 | A1 | 5/2011 | Conlin et al. |
| 2011/0226849 | A1 | 9/2011 | Padilla et al. |
| 2012/0296174 | A1 | 11/2012 | McCombie et al. |
| 2013/0244475 | A1 | 9/2013 | Sayadi et al. |
| 2015/0207275 | A1 | 7/2015 | Wegelin et al. |

OTHER PUBLICATIONS

Written Opinion of the International Searching Authority for PCT/US13/47679 dated Nov. 22, 2013; 6 pages.

Xceedid Corporation, XF1500 Wall Mount Reader, Document No. XC-5848, Oct. 2010, 2 pages.

Xceedid Corporation, XF1500 and XF1500CS4 Installation Guide, Document No. 0405-03, Issue No. 1, May 2009, 2 pages.

HID Global Corporation, iClass Installation Guide, 2010, 6400-901-C.1; 12 pages.

HID Global, Physical Reader Security, Tamper and Supervisor Features, Application Note, Feb. 2011, AN112, Rev. B.0, 8 pages.

Canadian First Office Action; Canadian Intellectual Property Office; Canadian Application No. 2,877,952; dated Dec. 21, 2015; 4 pages.

* cited by examiner

ACCESS CREDENTIAL READER CONNECTOR

CROSS REFERENCE TO RELATED APPLICATIONS

The present application is a continuation of U.S. patent application Ser. No. 15/659,006 filed Jul. 25, 2017 and issued as U.S. Pat. No. 10,176,653, which is a continuation of U.S. patent application Ser. No. 13/926,776 filed Jun. 25, 2013 and issued as U.S. Pat. No. 9,715,776, which claims the benefit of U.S. Provisional Patent Application No. 61/664,147 filed Jun. 25, 2012, the contents of each application incorporated herein by reference in their entirety.

TECHNICAL FIELD

The present invention relates to access control systems, and more particularly, but not exclusively, to the installation of a wall mounted access credential reader.

BACKGROUND

The current practice for installation of an access credential reader includes soldering a pigtail harness into the reader while leaving several bare wires exposed for connection to wiring in a structure. Typically, an installer attaches one of the bare wires to a corresponding wire from the structure, then hangs the reader from the wire while connecting the remainder of the wires to the corresponding wires from the structure. This approach is time consuming, cumbersome, and can result in loose connections and/or marring of the reader or adjacent structures. Accordingly, there remains a need for further contributions in this area of technology.

SUMMARY

One embodiment of the present invention is directed to a unique wiring connection for an access reader. Other embodiments include apparatuses, systems, devices, hardware, methods, and combinations for connecting an access reader to wiring located within a structure. Further embodiment, forms, features, aspects, benefits, and advantages of the present invention shall become apparent from the description and figures provided herewith.

DESCRIPTION OF THE DRAWINGS

Features of the invention will be better understood from the following detailed description when considered in reference to the accompanying drawings, in which.

DETAILED DESCRIPTION

Figure 1:
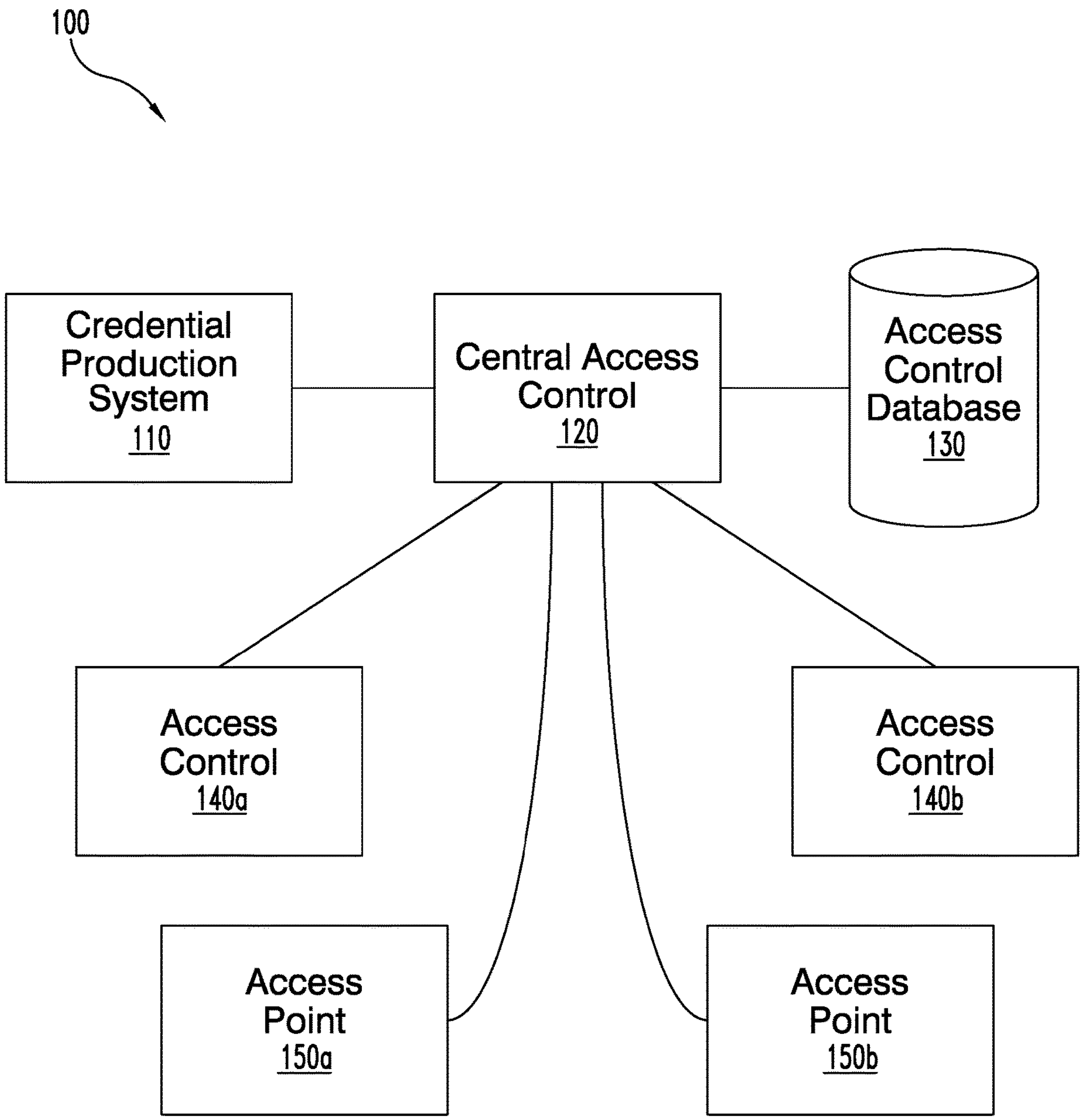
FIG. 1 is a schematic illustration of an access control system.

For purposes of promoting an understanding of the principles of the invention, reference will now be made to the embodiments illustrated in the drawings and specific language will be used to describe the same. It will nevertheless be understood that no limitation of the scope of the invention is hereby intended, any alterations and further modifications in the illustrated device, and any further applications of the principles of the invention as illustrated therein being contemplated as would normally occur to one skilled in the art to which the invention relates.

Referring to FIG. 1, shown therein is a conventional access control system 100 according to one form of the invention. System 100 includes a central access control 120 and a number of access control devices 140*a*, 140*b*. The central access control 120 is associated with an access control database 130 and a credential production system 110 that serves to generate access credentials. In a typical scenario, the central access control 120, the credential production system 110, and the access control database 130 are maintained by security personnel. The security personnel maintain the access control database 130 as a list of all persons authorized to enter various access points 150*a* and 150*b* on the premises. The access information associated with each person is gathered from the access control database 130 and is programmed into a blank access credential such as, for example, a smart card or proximity card, using access credential production system 110. Additionally or alternatively, the access production system 110 can be utilized to generate one or more access input codes, with each access input code being assigned to an individual or individuals, to be stored in the access control database 130. This programmed access credential or input code can then be used to access one or more of access points 150*a*, 150*b* via presentation to respective access control devices 140*a*, 140*b* which can be a card reader and/or a keypad mounted proximate to an access controlled door.

In the system 100, the individual access control devices 140*a*, 140*b* are configured to read access credentials. In response to a correct credential being presented to the access control devices 140*a*, 140*b*, an actuator (not shown) can be activated which is associated with the respective access points 150*a*, 150*b*. To make the determination to activate an actuator and thereby grant access, the access control device 140*a*, 140*b* reads the access credential and then transmits the credential or information derived from the credential to the central access control 120 where a look up function is performed. The lookup function can include accessing the access control database 130 to determine whether a credential presented at a given access control device 140 is authorized for accessing the access point 150 associated with the access control device 140. A message indicating the authorization status can be sent from the central access control 120 back to the access control device 140. In instances where the authorization is positive, the access control device 140 can communicate with the actuator of the access point 150 to grant the user access. Alternatively, the message indicating a positive authorization can be sent directly to the actuator of the access point 150 without passing through access control device 140. Other information may be transmitted between the access control device 140 and the central access control 120 to further enhance the integrity of the access control system 100, for example error codes indicating tampering, power failures, etc.

Figure 2:
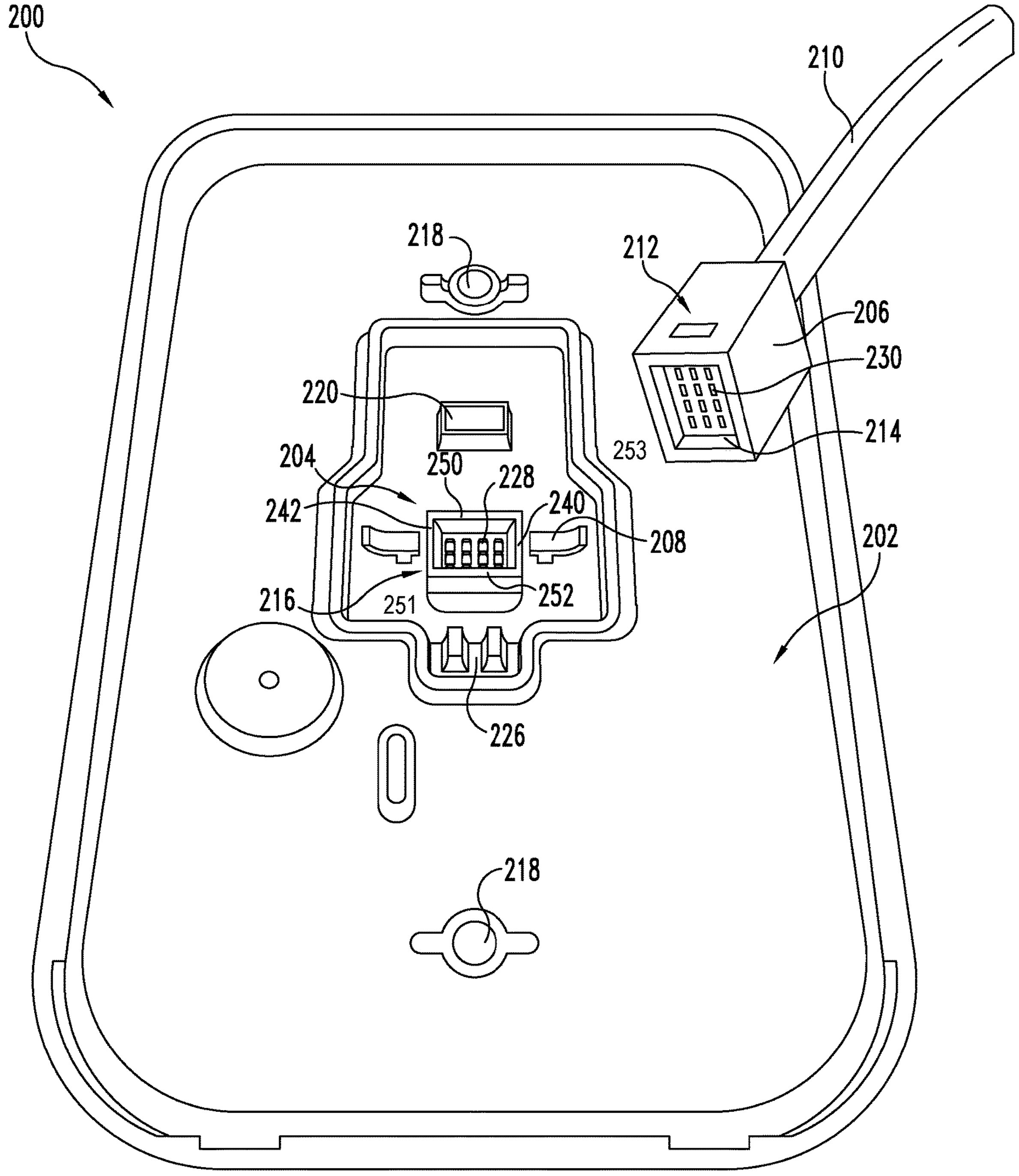
FIG. 2 is a view of an embodiment of an access reader including a connector.

Referring to FIG. 2, shown therein is a rearward view of one embodiment of an access reader 200. The access reader 200 includes a case or housing 202. The housing 202 houses a printed circuit board (not shown) and other associated electronics (not shown) such that the reader 200 can receive and/or interpret one or more inputs from a card, keypad or other device, can communicate with and/or receive communications from the central access control 120, and/or can perform other desired functions. The access reader 200 can receive various inputs, such as from a multi-frequency smart card, a proximity card, and/or other radio-frequency identification (RFID) cards, devices, fobs, etc., examples of which are disclosed in commonly-owned U.S. Patent Application Publication No. 2011/0115603 filed Nov. 10, 2010, the contents of which are incorporated herein by reference. The access reader can further receive inputs from a keypad, keyboard, or other types of data input devices.

The access reader 200 further includes a connector 204 in electronic communication with electronics (not shown) inside the housing 202. The connector 204 is structured to be connected to another connector or wiring harness 206. The wiring harness 206 is connected to a cable 210. The cable 210 includes a plurality of wires or leads across which electronic communications or signals are transmitted. Electronic communications/signals can include analog or digital signals, data, electric current or voltage, various waveforms, credentials, inputs or outputs, and/or any other forms of electrical communications or signals. Each of the plurality of wires within the cable 210 can be connected to an individual receiving member or pin 230 within the harness 206.

The cable 210 can be connected to the central access control 120 and a power source, among other possible connections for the cable 210. The cable 210 can be a dedicated access cable to provide power and electronic communication to the access reader 200. The cable 210 can pass through portions of a structure, such as through walls, conduit, etc., in order to provide electronic communications and signals to/from the access reader 200 and the central access control 120.

The connector 204 mates with the wiring harness 206 in a manner such that electronic communications/signals pass therethrough. In one form, the harness 206 includes a plurality of receiving members or pins 230 structured to receive a plurality of receiving members or pins 228 located in the connector 204. It is contemplated that the connector 204 can include a plurality of pins 228 to be received by a plurality of receiving members 230 in the harness 206, or the connector 204 can alternatively include a plurality of receiving members which receive a plurality of pins in the harness. The plurality of pins 228 can be raised from a surface of the housing 202 or can be flush with the housing 202, and the receiving members 230 can be recessed to receive the plurality of pins 228 or can be flush with a housing of the harness 206. It is contemplated that the pins 228 and the receiving members 230 can take any form such that upon connection of the harness 206 to the connector 204, electronic communications/signals can pass between the pins 228 and the receiving members 230.

Additionally, the connector 204 and the harness 206 can include any number of pins 228 and receiving members 230 depending upon the application and the extent of electronic communications/signals to be transferred from or received by the access reader 200. In various forms, the connector 204 and harness 206 can include between four to twelve pin connections. In one specific form, the cable 210 includes twelve discrete wires, each connected to a corresponding one of the receiving members 230. In this form, the connector 206 can include a 4×3 array of pins 228, and the harness 206 can include a corresponding 4×3 array of receiving members 230, thereby forming a twelve pin connection as illustrated in FIG. 2. An illustrative example of electronic communications/signals transmitted across each wire/pin 228/pin receiving member 230 is shown in Table 1 below.

TABLE 1

| Pin # | Function |
|---|---|
| 1 | Z(485)/unused |
| 2 | Power |
| 3 | Ground |
| 4 | Red LED |
| 5 | Y(485)/unused |
| 6 | Ground |
| 7 | Not used |
| 8 | Tamper |
| 9 | Data 0 |
| 10 | Beeper |
| 11 | Data 1 |
| 12 | Green LED |

The connector 204 and the wiring harness 206 are retained in such a manner as to prevent a break in the electronic communication between the pins 228 and the receiving members 230. In one form, a projecting walled structure 216 surrounding the plurality of pins 228 is raised and is configured to be received within a recess 214 in a housing of the harness 206. The walled structure 216 can include sidewalls 240, 242 which are shorter than the sidewalls 250, 252. The sidewalls 240, 242, 250, and 252 can engage in a plurality of corresponding recesses (not shown) or a single recess 214 in the harness 206 so as to form a protective boundary to effectively isolate the electrical contacts from degradation due to environmental effects. In one specific form, the sidewall 252 can include a slot to align with a corresponding tab within the harness 206 to provide a keying feature (not shown) structured to permit the harness 206 and connector 204 to mate in a single direction/orientation. The connector 204 can additionally or alternatively be retained in secure engagement with the harness 206 via one or more clips 208. The clips 208 are configured to lockingly engage with one or more corresponding recesses or notches 212 in the harness 206. The clips 208 can be tapered inwardly such that as the harness 206 is pressed onto the connector 204, the clips deflect outwardly and then snap back to engage the recess 212.

The singular connection between the connector 204 and the harness 206 can complete all the electrical connections necessary to place the access reader 200 into communication with the access control system 100. This connection can provide power to the access reader 200, place the access reader 200 in electronic communication with the central access control 120, provide credential inputs from the access reader 200 to the central access control 120, provide updates from the central access control 120 to the access reader 200, and/or can provide other types of electronic communications or signals to the access reader 200.

The housing 202 can further include a magnetic swipe reader connector 220. A magnetic swipe reader (not shown) can be integrated with the access reader 200. In other forms, the magnetic swipe reader can be mounted near or on an outer housing of the access reader 200. The magnetic swipe reader may be placed in electronic communication with the access reader 200 through the magnetic swipe reader connector 220. As discussed above regarding other inputs, a magnetic swipe reader input can be communicated from the access reader 200 through the connectors 204, 206, across the cable 210, and to the central access control 120.

The housing 202 can further include a tamper detector 226. In one embodiment, the tamper detector 226 can be an optical sensor 226, a magnetic sensor, a motion sensor, or any other sensor or detector 226 that is operable to detect movement of the housing 202 relative an object to which the housing 202 is retained, such as a backplate. The tamper detector 226 can communicate a tamper signal from the access reader 200 to the central access control 120 or to an alarm (not shown). The housing 202 can include one or more mounting holes 218 to retain the housing 202 to the backplate 308, as illustrated in FIG. 3.

Figure 3:
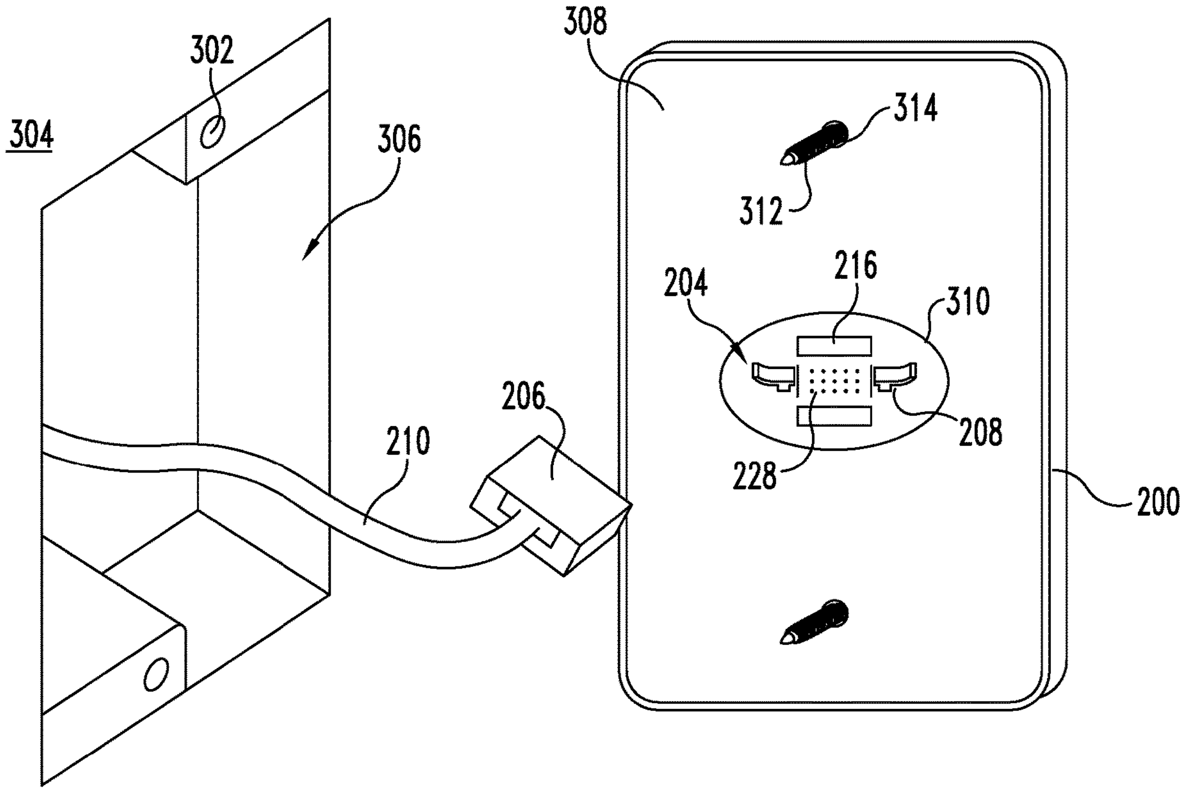
FIG. 3 is a view of an embodiment of an access reader including a backplate.

Referring to FIG. 3, the housing 202 can be retained to a backplate 308. The backplate 308 includes a hole of sufficient size to permit the harness 206 to pass therethrough to connect with the connector 204 of the access reader 200. The backplate 308 can be mounted directly to a wall 304 or to a gang box 306 inserted into an opening or recess in the wall 304. Although FIG. 3 illustrates the backplate 308 as being coupled to the access reader 200 prior to installation of the backplate 308 to the wall 304, in another embodiment, an installer can set the access reader 200 aside, pull the harness 206 through the hole 310 in the backplate 308, and then install a plurality of screws 312 extending through holes 314 either directly into the wall 304 or into screw receiving openings 302 in the gang box 306, thereby attaching the backplate 308 to the wall 304. An installer can then grasp the access reader 200, connect the harness 206 to the connector 204, push any excess cable 210 into the gang box 306 or the wall 304, and attach the access reader 200 to the backplate 308. The backplate 308 can cover the backside of the housing 202 and can extend onto a side wall of the housing 202. The backplate 308 can further include a sensing pad, optic tape, or other device (not shown) to cooperate with the tamper detector 226 and allow the tamper detector 226 to detect movement of the housing 202 relative the backplate 308.

Figure 4:
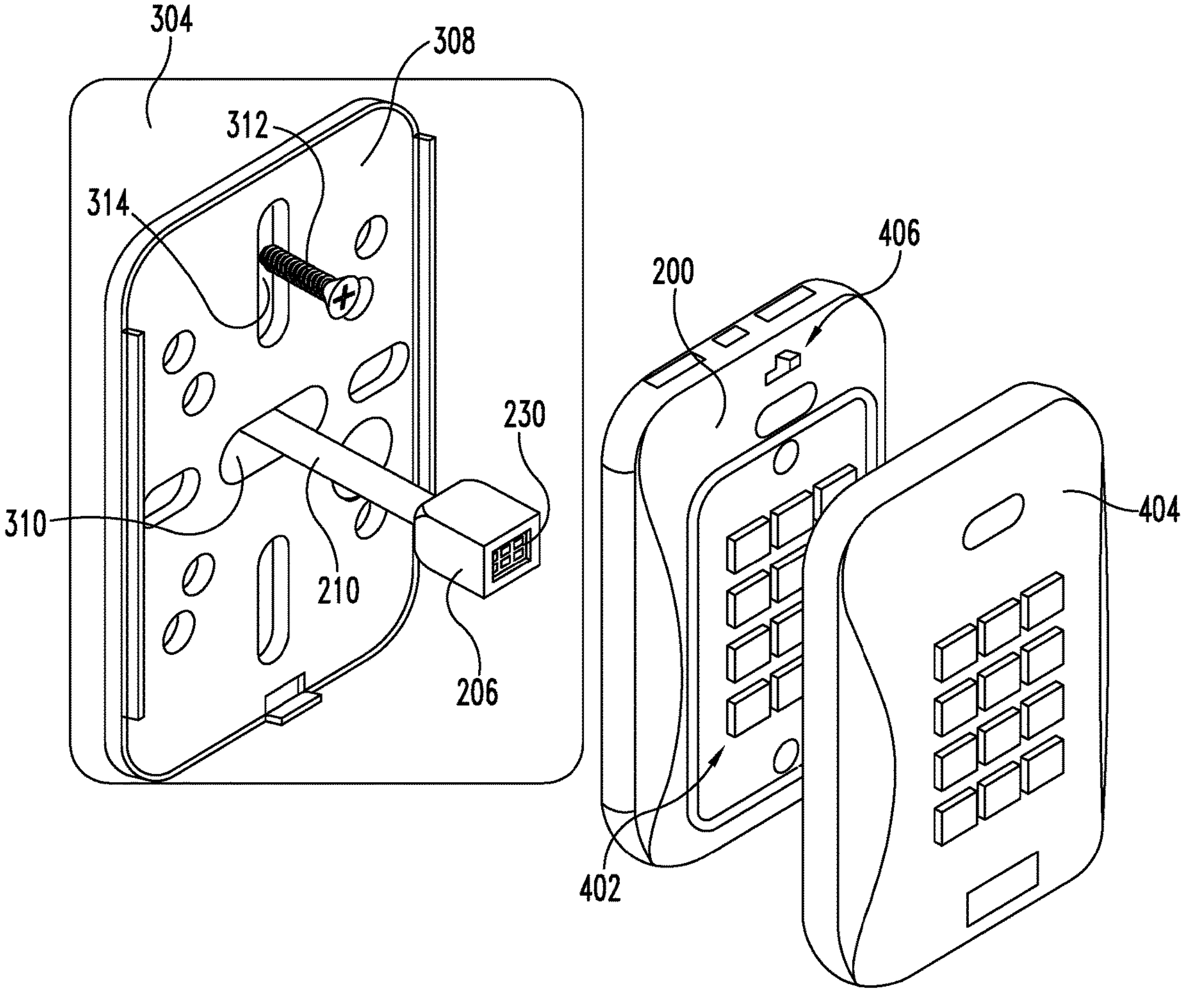
FIG. 4 is a view of an embodiment of an access reader assembly.

Referring now to FIG. 4, various stages of assembly of the access reader 200 are illustrated. The backplate 308 is illustrated as being attached to the wall 304, with the harness 206 and a portion of the cable 210 extending through the hole 310 of the backplate. Upon connection of the connector 204 to the harness 206, the access reader 200 can be retained to the backplate 308. The access reader 200 can be retained to the backplate 308 through a plurality of screws, such as screws 312 which extend through a portion of the access reader 200 and into the backplate 308. A plurality of clips, retainers, or any other suitable retention device can be used to retain the access reader 200 to the backplate 308. The assembly can also include a coverplate 404 which can cover a portion of the housing 202 and any fasteners which retain the housing 202 to the backplate 308. The coverplate 404 can be retained to the access reader 200 via a fastening device such as, for example, a clip 406, a clip 406 and a screw, a plurality of screws, a plurality of clips, or any other fastening devices capable of attaching the coverplate 404 to the access reader 200.

FIG. 4 further illustrates that the access reader 200 can include a plurality of keys, such as in the form of keypad 402, to permit a user to enter a numeric, alphabetic, or other inputs into the access reader 200, as an alternative or in addition to the use of a card including a credential as aforementioned. The access reader 200 can additionally include a plurality of features including lights (such as LED lights to indicate when access has been granted, denied, or if a card is in proximity to the access reader 200), a beeper (to indicate if access has been granted or denied), an alarm (to indicate if the tamper sensor 226 has detected motion or other tampering), or any other suitable features and/or devices which would be deemed desirable for inclusion within the housing 202.

While the invention has been described in connection with what is presently considered to be the most practical and preferred embodiment, it is to be understood that the invention is not to be limited to the disclosed embodiment(s), but is instead intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as falling within the scope of the invention, that scope being defined by the claims that follow. In reading the claims, it is intended that when words such as "a," "an," "at least one" and "at least a portion" are used, there is no intention to limit the claim to only one item unless specifically stated to the contrary in the claim. Further, when the language "at least a portion" and/or "a portion" is used, the item may include a portion and/or the entire item unless specifically stated to the contrary.

What is claimed is:

1. An access reader assembly configured for connection to a wiring harness, the access reader assembly comprising:

a housing having a front and a rear, the rear of the housing including a connector comprising a deflectable clip and a plurality of first electrical connectors, wherein the deflectable clip is configured to lockingly engage the wiring harness to maintain electrical connection between the plurality of first electrical connectors and a plurality of second electrical connectors included in the wiring harness; and a credential reader mounted to the housing and configured to receive credential information from a user, wherein the credential reader is in electrical communication with the plurality of first electrical connectors, is configured to receive electrical power via a first of the first electrical connectors, and to transmit the credential information via a second of the first electrical connectors.

2. The access reader assembly of claim 1, wherein each of the first electrical connectors comprises one of a male pin adaptor and a female pin receiver; and wherein each of the second electrical connectors comprises the other of the male pin adaptor and the female pin receiver.

3. The access reader assembly of claim 1, wherein the housing further includes a pair of apertures configured to receive fasteners by which the access reader assembly is operable to be coupled to a wall.

4. The access reader assembly of claim 1, further comprising a backplate operable to be secured to the rear of the housing, the backplate including a hole through which the connector is accessible when the backplate is secured to the rear of the housing.

5. The access reader assembly of claim 4, further comprising a tamper detector configured to detect movement of the housing relative to the backplate.

6. The access reader assembly of claim 1, wherein the connector further comprises a wall structure projecting from the rear of the housing and surrounding the plurality of first electrical connectors.

7. The access reader assembly of claim 6, wherein a sidewall of the wall structure is positioned between the deflectable clip and the plurality of first electrical connectors.

8. A system including the access reader assembly of claim 1, the system further including a cable, the cable including the wiring harness; and wherein the wiring harness is lockingly engaged by the deflectable clip to maintain electrical connection between the plurality of first electrical connectors and the plurality of second electrical connectors.

9. The system of claim 8, further comprising a central access control electrically connected with the credential reader assembly via the cable; and wherein the central access control is configured to compare the credential information with an access credential to allow or deny access.

10. A method, comprising:

electrically connecting a cable to a central access control, the cable including a plurality of wires and a wiring harness including a plurality of first electrical connectors, wherein each of the wires is connected with a corresponding one of the first electrical connectors; and coupling the wiring harness to a connector located in a housing of an access reader assembly to electrically connect the plurality of first electrical connectors with a plurality of second electrical connectors electrically connected to a credential reader of the access reader assembly; wherein the coupling the wiring harness to the connector further comprises lockingly coupling a deflectable clip extending from a rear side of the housing within a notch in the harness housing.

11. The method of claim 10, wherein coupling the wiring harness to the connector comprises placing a wall structure that outwardly projects from a rear side of a housing of the access reader within a recess in a harness housing of the wiring harness, and wherein the wall structure is sized to provide a protective barrier about the plurality of second electrical connectors.

12. The method of claim 10, further comprising transmitting power to the credential reader via a first of the wires, a first of the first electrical connectors, and a first of the second electrical connectors; and transmitting data from the credential reader to the central access control via a second of the wires, a second of the first electrical connectors, and a second of the second electrical connectors.

13. The method of claim 10, further comprising:

passing the wiring harness through an opening in a backplate prior to coupling the wiring harness to the connector;

securing the housing to the backplate; and securing the backplate to a wall.

14. The method of claim 10, further comprising:

securing the housing to a backplate;

detecting, via a tamper detector of the access reader assembly, movement of the housing relative to the backplate; and transmitting a tamper signal to the central access control via one of the wires, one of the first electrical connectors, and one of the second electrical connectors.

15. An access reader assembly, comprising:

a credential reader configured to receive a credential input from a user;

a housing to which the credential reader is mounted, wherein the housing includes a first connector, and wherein the first connector comprises a plurality of first electrical connectors electrically connected with the credential reader and configured for connection with a corresponding plurality of second electrical connectors;

a wall structure projecting outwardly from a rear side of the housing and surrounding the plurality of first electrical connectors, the wall structure including a plurality of sidewalls; and a deflectable clip extending from the rear side of the housing, the deflectable clip configured to lockingly engage a connector housing of a second connector including the plurality of second connectors; and wherein one of the sidewalls is positioned between the deflectable clip and the plurality of first electrical connectors.

16. The access reader assembly of claim 15, wherein the credential reader is structured to receive electrical power via a first of the first electrical connectors and to transmit information relating to the credential input from the user via a second of the first electrical connectors.

17. The access reader assembly of claim 15, further comprising:

a backplate to which the housing is secured; and a tamper detector configured to detect movement of the housing relative to the backplate.

18. A system including the access reader assembly of claim 15, the system further comprising a cable including a plurality of wires and the second connector;

wherein each of the wires is electrically connected with a corresponding one of the second connectors; and wherein the deflectable clip is engaged with a notch formed in an outer surface of the connector housing to retain electrical connections between the plurality of first electrical connectors and the plurality of second electrical connectors.

19. The system of claim 18, further comprising a central access control; and wherein the central access control is electrically connected with the credential reader via the plurality of wires, the plurality of first electrical connectors, and the plurality of second electrical connectors.

* * * * *